No. 608,684. Patented Aug. 9, 1898.
F. KAHN.
HEAT RETAINER.
(Application filed May 3, 1898.)
(No Model.)
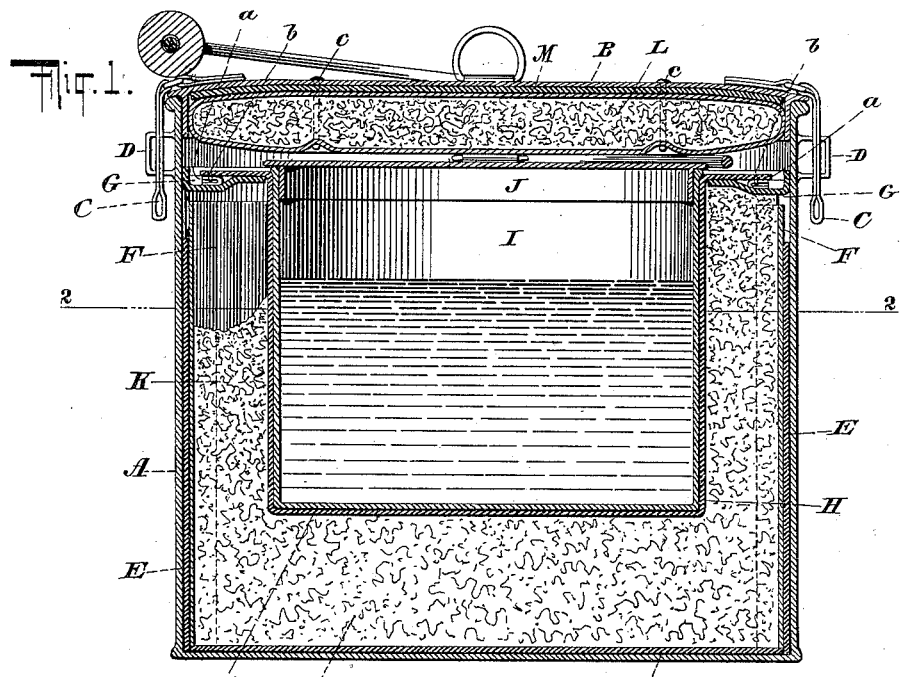
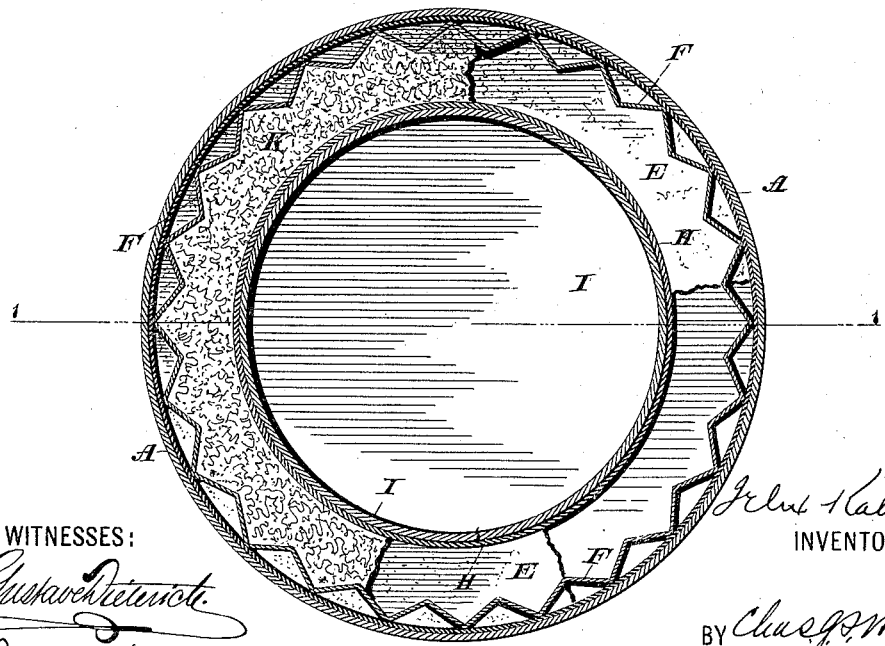
WITNESSES:
INVENTOR
ATTORNEY

UNITED STATES PATENT OFFICE.

FELIX KAHN, OF NEW YORK, N. Y.

HEAT-RETAINER.

SPECIFICATION forming part of Letters Patent No. 608,684, dated August 9, 1898.

Application filed May 3, 1898. Serial No. 679,592. (No model.)

*To all whom it may concern:*

Be it known that I, FELIX KAHN, of the city of New York, borough of Manhattan, county and State of New York, have invented certain new and useful Improvements in Heat-Retainers, of which the following is a full, clear, and exact specification.

My invention relates to apparatus for retaining heat, and has for its object to provide a receptacle for victuals wherein the same may be kept heated after their removal from the stove or fire.

To this end my invention consists in the novel details of construction and the combination, connection, and arrangement of parts, as hereinafter more fully described, and then pointed out in the claims.

In the accompanying drawings, forming part of this specification, wherein like letters of reference indicate like parts, Figure 1 is a central vertical section of an apparatus constructed according to and embodying my invention, said section being taken on the line 1 1 of Fig. 2; and Fig. 2 is a section, partly broken away, taken on the line 2 2 of Fig. 1.

In said drawings, A designates a sheetmetal kettle of ordinary construction, which constitutes the outer shell of the apparatus. B denotes the cover for said kettle or shell A, said cover being provided with hasps C C, adapted to engage the staples D D on the kettle A to maintain the cover B in position thereon.

Within the kettle A, adjacent to its inner side and bottom, is provided a lining E of asbestos or analogous material, and within said kettle A, adjacent to the vertical portion of said lining E, is disposed a circular corrugated partition F, whereby an air-space is maintained between the outer shell or kettle A and the interior of the apparatus.

Within the kettle A, near its top, is arranged an annular shelf G, which is provided at intervals upon its upper surfaces with hooks $a$, and H denotes a pouch, made of felt or analogous material, provided upon its outer surface, near its upper edge, with loops $b$, adapted to engage the hooks $a$ on the annular shelf G, whereby to maintain said pouch H in position within the kettle A.

I denotes the inner receptacle, adapted to receive the victuals or other matter to be maintained warm, said receptacle being provided with a cover J, and K denotes a filling of loose hair, felt, or other anologous substance which does not conduct heat, and said filling is interposed between the outer surface of the pouch H and the inner surface of the circular corrugated partition F and the base of the outer shell A.

L denotes a pad composed of a casing of felt filled with hair or analogous material, and M denotes a lining of abestos interposed between the pad L and the under side of the cover B. The pad L is interposed between the cover J of the inner receptacle and the annular shelf G, surrounding the same and the cover B of the outer shell, and both the pad L and lining M are secured to the under side of said cover B by rivets $c$.

Having thus described my invention, what I claim, and desire to secure by Letters Patent, is—

1. An apparatus for the purposes specified, comprising an outer shell, a cover therefor, a lining of non-conducting material, arranged therein, a corrugated partition arranged within said shell adjacent to its vertical side, an annular shelf disposed within said shell, adjacent to its upper edge, a pouch, means for securing the same at its upper edge to said annular shelf, a filling of non-conducting fibrous material interposed between said pouch and the outer shell, a receptacle disposed within said pouch, a cover therefor, and a filling of non-conducting material interposed between the top of the inner receptacle, and shelf surrounding the same, and the under side of the cover of the outer shell, substantially as specified.

2. An apparatus for the purposes specified, comprising an outer shell or receptacle, a cover therefor, and means for securing said cover to said outer shell or receptacle, a lining of asbestos arranged within said outer shell or receptacle, adjacent to its base, side and cover, a circular corrugated partition arranged within said outer shell or receptacle, adjacent to the inner vertical side thereof, and extending almost to the top of said outer shell or receptacle, an annular shelf disposed within said outer shell or receptacle adjacent to its top, hook members provided thereon upon its upper surface, a pouch composed of felt provided along its upper edge with loops adapted to engage the hooks on the annular shelf, a filling of loose non-conducting fibrous material interposed within the outer shell between the pouch and the base and side of the outer shell or receptacle, a receptacle disposed within said pouch, a cover for said receptacle, and a pad of non-conducting material interposed between the cover of the last-mentioned receptacle and the shelf surrounding the same, and the under side of the cover of the receptacle first mentioned, said pad being secured to the under side of the cover of the receptacle first mentioned, substantially as specified.

Signed at the city of New York, in the county and State of New York, this 29th day of April, 1898.

FELIX KAHN.

Witnesses:
  JULIA WIRTH,
  MARTHA GULDNER.